United States Patent
Tei et al.

(10) Patent No.: US 7,147,944 B2
(45) Date of Patent: Dec. 12, 2006

(54) SUBSTRATE FOR MAGNETIC RECORDING MEDIA USING DRIED THERMOPLASTIC NORBORNENE RESIN AND MAGNETIC RECORDING MEDIA USING SUBSTRATE

(75) Inventors: Youich Tei, Nagano (JP); Syoji Sakaguchi, Kawasaki (JP); Katsunori Suzuki, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/784,027

(22) Filed: Feb. 20, 2004

(65) Prior Publication Data
US 2004/0163273 A1 Aug. 26, 2004

Related U.S. Application Data

(62) Division of application No. 09/912,449, filed on Jul. 25, 2001, now Pat. No. 6,722,057.

(30) Foreign Application Priority Data
Jul. 25, 2000 (JP) .............................. 2000-224644

(51) Int. Cl.
G11B 5/73 (2006.01)
(52) U.S. Cl. ................. 428/848.8; 428/847; 428/848.2; 428/847.8; 427/129
(58) Field of Classification Search .............. 428/64.2, 428/65.3, 694 SL, 500, 847.8, 848.8
See application file for complete search history.

(56) References Cited

U.S. PATENT DOCUMENTS

| | | | |
|---|---|---|---|
| 5,187,012 A | 2/1993 | Takashashi et al. | |
| 5,366,812 A | 11/1994 | Takahashi et al. | |
| 5,439,722 A * | 8/1995 | Brekner et al. ............ | 428/65.1 |
| 5,585,989 A | 12/1996 | Kuromiya et al. | |
| 6,333,089 B1 * | 12/2001 | Hirata et al. ............... | 428/64.1 |
| 6,991,863 B1 * | 1/2006 | Murata et al. .............. | 428/848 |
| 2001/0056051 A1 | 12/2001 | Tei et al. | |

FOREIGN PATENT DOCUMENTS

| JP | 7-224155 A1 | 8/1995 |
|---|---|---|
| JP | 11-166039 A1 | 6/1999 |

OTHER PUBLICATIONS

Derwent Abstract Accession No. 2001-231064/24, JP 2001034930 A; Nippon Zeon KK; Feb. 9, 2001.

* cited by examiner

*Primary Examiner*—Kevin M. Bernatz
(74) *Attorney, Agent, or Firm*—Darby & Darby

(57) ABSTRACT

The gas components in thermoplastic norbornene resin pellets are suppressed below certain levels by drying the resin under vacuum or under the ordinary pressure and under vacuum. A substrate for magnetic recording media is manufactured by injection-molding the resin dried by the method according to the invention. The magnetic recording medium, employing the substrate manufactured according to the invention, includes at least a magnetic layer, a protection layer on the magnetic layer and a liquid lubricant layer on the protection layer. The magnetic recording medium is manufactured by forming these layers, one after another, on the substrate according to the invention.

12 Claims, 1 Drawing Sheet

SUBSTRATE FOR MAGNETIC RECORDING MEDIA USING DRIED THERMOPLASTIC NORBORNENE RESIN AND MAGNETIC RECORDING MEDIA USING SUBSTRATE

This application is a division of U.S. patent application Ser. No. 09/912,449 (now U.S. Pat. No. 6,722,057) filed 25 Jul. 2001, and claims the benefit of priority to Japanese Patent Application No. JP 2000-224644 filed Jul. 25, 2000.

FIELD OF THE INVENTION

The present invention relates to a method of drying a thermoplastic norbornene resin used as a raw material for the substrate of a magnetic recording medium mounted on the external memory of a computer and such a magnetic memory for storing digital data. The present invention also relates to a substrate for magnetic recording media containing the thermoplastic norbornene resin dried by the method according to the invention, a magnetic recording medium including the substrate according to the invention and a method of manufacturing the magnetic recording medium, such as a hard disk, using the substrate according to the invention.

BACKGROUND OF THE INVENTION

As the capacities of the storage apparatuses that use magnetic recording media become larger, the flying heights of the magnetic heads have been lowered to improve the recording densities. The magnetic recording medium must have a very flat and smooth surface, that is to have a very precise surface structure, to lower the flying height of a magnetic head. For example, it is required that the conventional nonmagnetic metal substrate, such as an aluminum (Al) substrate, be machined precisely.

The conventional nonmagnetic metal substrate and the conventional magnetic recording medium using the conventional nonmagnetic metal substrate are manufactured in the following way.

Usually, a blank disk, prepared by rolling a molten metal, heating the rolled metal, annealing the heated metal and machining the annealed metal to have the predetermined dimensions, is used for a nonmagnetic substrate. The blank disk is machined to have a predetermined inner diameter and a predetermined outer diameter. The flatness and the smoothness of the machined blank disk is improved by lapping. A Ni—P layer of 13 μm in thickness is plated on the blank disk to improve the surface hardness thereof. The surface of the Ni—P layer is polished to a surface roughness Ra of 10 Å. Final lapping using diamond slurry is applied to the polished surface of the blank disk. Laser zone textures are formed in the contact start stop (CSS) zone of the thus obtained substrate such that the bump height is, for example, 190 Å and the bump density is, for example, 30×30. Finally, the substrate is washed meticulously, resulting in a substrate for magnetic recording media.

A chromium (Cr) undercoating layer of 500 Å in thickness, a Co-14Cr-4Ta magnetic layer of 300 Å in thickness and a carbon protection layer of 80 Å in thickness are deposited one after another on the substrate for magnetic recording media by the DC sputtering method. The surface of the as deposited laminate is burnished using a burnishing tape and a fluorine lubricant layer of 20 Å in thickness is formed on the burnished surface by dip-coating or by spin-coating, resulting in a magnetic recording medium.

The method of manufacturing the conventional substrate for magnetic recording media and the method of manufacturing the conventional magnetic recording medium are becoming more complicated to meet the recent requirements for a higher recording density. Moreover, it is required to manufacture a magnetic recording medium with reduced costs while maintaining high functions. Novel magnetic recording media, that use a plastic substrate, have been proposed to meet these contradictory requirements.

A method that manufactures a plastic substrate by molding and, at the same time, forms the CSS zone thereof with excellent productivity, is advantageous to industrially provide magnetic recording media with low manufacturing costs.

However, the plastic substrates manufactured by injection molding synthetic resin pellets are inferior to the metal substrates and the ceramic substrates, such as a glass substrate, from the view points of surface flatness and smoothness, since rugged surface portions of several μm in height difference and micro waviness are caused by molding. The rugged portions and the micro waviness are hazardous for realizing a very flat and smooth surface, which is a prerequisite for the magnetic recording medium.

The magnetic recording medium formed on the substrate including the rugged portions and the micro waviness is also hazardous for reading out data to the magnetic head and for writing data from the magnetic head. Especially when a low-flying-height head conducts continuous seek at a high speed, the flight thereof is not stabilized and, in the end, head crash is the result. Thus, the conventional plastic substrate impairs the durability of the magnetic recording medium.

Polycarbonate resins and poly(methyl methacrylate) resins are used for the material of the plastic substrate for magnetic recording media. In addition to these resins, thermoplastic norbornene resins are used for the material of the plastic substrate for magnetic recording media. The thermoplastic norbornene resin, that exhibits excellent thermal resistance, low hygroscopicity and excellent shape stability, is useful to provide excellent magnetic recording media. However, the problems described above are posed also on the substrate made of the thermoplastic norbornene resin.

The commercial products of the thermoplastic norbornene resin include APEL supplied from Mitsui Chemicals, Inc. and ZEONEX supplied from Nippon Zeon Co., Ltd.

OBJECTS AND SUMMARY OF THE INVENTION

In view of the foregoing, it is a first object of the invention to provide a method of drying a thermoplastic norbornene resin for controlling the specific gas components therein below certain levels.

It is a second object of the invention to provide a very reliable plastic substrate, that contains less rugged portions and low micro waviness due to the use of a thermoplastic norbornene resin wherein the specific gas components therein are suppressed below certain levels by the method of drying described above.

It is a third object of the invention to provide a magnetic recording medium using the plastic substrate described above. More specifically, it is the third object of the invention to provide a magnetic recording medium that has a very flat and smooth surface with less rugged portions and low micro waviness and exhibits excellent durability against continuous and high-speed head seek.

It is a fourth object of the invention to provide a method of manufacturing the magnetic recording medium described above.

The extensive and intensive studies conducted by the present inventors have revealed that the foregoing objects of the invention are achieved by adjusting the gas components contained in a thermoplastic norbornene resin below certain levels by a specific drying method, and by manufacturing a magnetic recording medium using the dried resin.

According to a first aspect of the invention, there is provided a method of drying a thermoplastic norbornene resin, the method including drying the thermoplastic norbornene resin under vacuum or under the ordinary pressure and under vacuum to remove atmospheric gas components including $N_2$, $O_2$ and $H_2O$ and low-boiling-point organic components (organic impurities) including aliphatic components and aromatic components contained in the resin. The aliphatic components include low-molecular-weight aliphatic hydrocarbons and oxidation products of the resin such as alcohol compounds and carboxylic acid compounds. The aromatic components include the residues of the solvents used for synthesizing the resin.

Advantageously, the drying under the ordinary pressure is conducted at any temperature between 80 and 120° C., and the drying under vacuum is conducted under the degree of vacuum of 20 Pa or lower and at any temperature between 80 and 120° C.

Advantageously, the thermoplastic norbornene resin contains, after the drying, $N_2$ of 20 ppm or lower, $O_2$ of 20 ppm or lower, $H_2O$ of 1 ppm or lower, aliphatic components, that are low-boiling-point organic components, of 20 ppb or lower in total, and aromatic components, that are the other low-boiling-point organic components, of 20 ppb or lower in total.

According to a second aspect of the invention, there is provided a plastic substrate for magnetic recording media manufactured by injection molding the thermoplastic norbornene resin dried by any of the methods described above.

Advantageously, the substrate contains in the surface thereof 100 or less rugged portions of 1 μm×1 μm or wider in area.

Advantageously, the straightness Pa in the radial direction of the substrate is 1 μm or less, the micro waviness of the substrate is 500 Å or lower, and the average surface roughness of the substrate is 5 Å or lower.

According to a third aspect of the invention, there is provided a magnetic recording medium including a substrate, a magnetic layer above the plastic substrate, a protection layer on the magnetic layer, and a lubricant layer on the protection layer, the substrate being the plastic substrate described above.

Advantageously, the output of a strain gauge is 0.5 g or less at the end of continuous and high-speed head seek tests conducted for 24 hr on the magnetic recording medium rotating at 4500 rpm using a low-flying-height head, the flying height thereof is 1 μ".

According to a fourth aspect of the invention, there is provided a method of manufacturing a magnetic recording medium, the method including the steps of drying a thermoplastic norbornene resin by the method described above, injection-molding the dried thermoplastic norbornene resin to form a plastic substrate, forming a magnetic layer above the plastic substrate, forming a protection layer on the magnetic layer, and forming a lubricant layer on the protection layer.

The above, and other objects, features and advantages of the present invention will become apparent from the following description read in conjunction with the accompanying drawing.

DETAILED DESCRIPTION OF THE INVENTION

Figure 1:
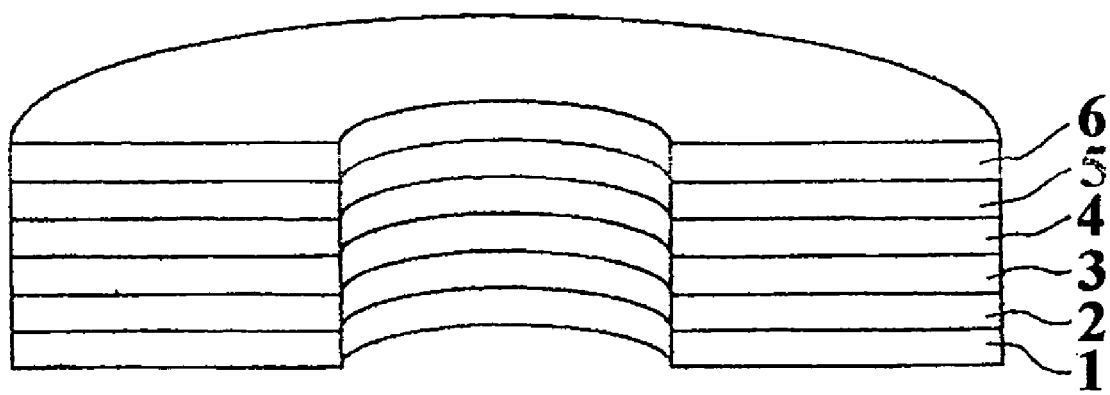
FIG. 1 is a cross sectional view of a magnetic recording medium according to the present invention.

As explained earlier, defects such as rugged surface portions of several μm in height difference and micro waviness are caused more easily on the plastic substrate formed by injection-molding the as supplied thermoplastic norbornene resin than on the metal substrate and the ceramic substrate such as a glass substrate. These defects, such as rugged portions and micro waviness, roughen the substrate surface.

It is considered that these defects, such as rugged portions and micro waviness, are caused from the amounts of gases contained in the norbornene resin pellets. The gases contained in the air are dissolved into the resin pellets while the resin pellets are synthesized. Usually, the resin pellets contain atmospheric gas components such as $N_2$, $O_2$, $H_2O$ and $CO_2$ at the level of from several tens ppm to several percent. Since the thermoplastic norbornene resin is nonpolar, $H_2O$ and such molecules that exhibit strong polarity hardly penetrate into the thermoplastic norbornene resin. Therefore, the thermoplastic norbornene resin is preferable due to its hygroscopicity much lower than the hygroscopicity of the other resins. However, even the thermoplastic norbornene resin contains gas components at the level of from several ppm to several hundreds ppm. Usually, the resins inclusive of the thermoplastic norbornene resin contain from several tens ppb to several percent of low-boiling-point organic components, such as the residue of the solvents for synthesizing the resin and low-molecular-weight aliphatic hydrocarbons. It is considered that the surface defects, such as rugged portions and micro waviness, are caused depending also on the amounts of the low-boiling-point organic components.

In short, it is considered that the atmospheric gases and the low-boiling-point organic components contained in the thermoplastic norbornene resin cause defects such as rugged portions of several μm in height difference and micro waviness in the substrate surface.

In this specification, the term "atmospheric gas components" is used to designate the gases such as $N_2$, $O_2$ and $H_2O$ contained in the air.

The term "low-boiling-point organic components" is used to designate the organic resin components (aliphatic components) and the aromatic components. The organic resin components include aliphatic hydrocarbons having from 3 to 14 carbon atoms such as raw materials, intermediate products and by-products of the norbornene resin, and oxidation products of the resin yielded by the oxidation of the norbornene resin such as aliphatic alcohol compounds having from 3 to 14 carbon atoms and carboxylic acid compounds having from 3 to 14 carbon atoms. The aromatic components include deteriorated antioxidants yielded by deterioration of the antioxidants added to stabilize the resin and residues of the solvents used for synthesizing the resin.

The atmospheric gas components and the low-boiling-point organic components are referred to collectively as the "gas components".

For injection-molding a thermoplastic norbornene resin, the resin is crashed and molten in a heating cylinder with a screw heated at any temperature between 300 and 380° C. The molten resin is injected into the cavity of a molding die. Since the injection molding machine has a closed structure from the heating cylinder to the inlet of the molding die, the gases generated between heating cylinder and the inlet of the molding die have no way to escape. The generated gases are transferred, together with the molten resin, to the cavity of the molding die. In the cavity, the molten resin flows radially and outwards to fill the cavity. The molten resin is cooled and solidified from the surface side of the cavity. When the generated gas amount is large, the molten resin flowing radially and outwards generates gases also in the cavity. As a result, the gas generation causes defects such as rugged surface portions of several μm in height difference. The gas generation obstacles the flow of the molten resin. The obstruction against the flow of the molten resin causes micro waviness in the radial direction of the substrate and increased surface roughness of the substrate.

When the resin contains $O_2$ and $H_2O$, the norbornene structure of the resin is oxidized easily under the molten state thereof between 300 and 380° C., causing modified low-molecular-weight portions therein. The difference between the fluidity of the modified low-molecular-weight portions and the fluidity of the norbornene resin and the difference between the polarity of the modified low-molecular-weight portions and the polarity of the norbornene resin cause defects.

The viscosity of the low-molecular-weight organic impurities contained in the resin is different from the viscosity of the norbornene resin. The viscosity difference causes fluidity difference between the low-molecular-weight organic impurities and the molten resin in the molding die. It is suspected that the low-molecular-weight organic impurities work, due to the fluidity difference, as nuclei, onto which defects are caused.

As described above, various low-boiling-point gas components contained in the norbornene resin pose many problems.

Quantitative analysis of the gas components contained in the norbornene resin is conducted to know the gas amounts in the conventional thermoplastic norbornene resin. The results of the quantitative gas analysis conducted on a polyolefin thermoplastic norbornene resin (ZEONEX 280R supplied from Nippon Zeon Co., Ltd.) are listed in Tables 1 and 2.

TABLE 1

Contents of atmospheric gas components in the resin samples (ppm)

|  | $N_2$ | $O_2$ | $H_2O$ |
|---|---|---|---|
| Lot A | 880 | 355 | 10.2 |
| Lot B | 809 | 257 | 7.9 |
| Lot C | 623 | 230 | 5.1 |

TABLE 2

Contents of organic impurities (ppb)

| | Aliphatic components ($C_6$–$C_{14}$) | | Aromatic components | |
|---|---|---|---|---|
| | Aliphatic hydrocarbons | Aliphatic alcohol and carboxylic acid compounds | Residues of solvents | Degraded antioxidants |
| Lot A | 100 | 60 | 40 | 20 |
| Lot B | 50 | 30 | 30 | 15 |
| Lot C | 30 | 10 | 20 | 10 |

The atmospheric gas components ($N_2$, $O_2$ and $H_2O$) in Table 1 are analyzed in the following way. A resin pellet (15 mg) is heated from 30 to 300° C. at the heating rate of 10° C./min under the degree of vacuum of $5 \times 10^{-19}$ Torr, or lower, in a thermal decomposition spectrometer (TDS supplied from ESCO, Ltd.). The gases generated from the heated resin pellet are transferred to a quadrupole mass spectrometer. Nitrogen gas $N_2$ is detected and measured quantitatively at M/Z=28, $O_2$ at M/Z=32, and $H_2O$ at M/Z=18.

The organic impurities in Table 2 are analyzed in the following way. Resin pellets of 10 gr are heated at 120° C. The organic gases generated from the heated resin pellets are absorbed to active carbon. The absorbed organic gases are desorbed from the active carbon by the purge and trap (P & T) method. The desorbed organic gases are analyzed qualitatively and quantitatively with a gas chromatograph-mass spectrometer (P & T GC-MS supplied from Shimadzu Corp.).

The results described in Tables 1 and 2 indicate the following things.

(1) Among the atmospheric gas components, the concentration of $N_2$ and $O_2$ in the as supplied norbornene resin are high. The concentration of $H_2O$ in the as supplied norbornene resin is much lower than that of $N_2$ and $O_2$. However, $H_2O$ of around 10 ppm accelerates expansion and deformation of the resin when the resin is exposed to a high-temperature atmosphere.

(2) The concentration of low-molecular-weight aliphatic hydrocarbons, that are the raw materials and the by-products of the norbornene resin, and the concentration of aliphatic alcohol compounds and carboxylic acid compounds (oxidation products of the resin) are high. The as supplied norbornene resin also contains aromatic components, such as degradation products of the antioxidant yielded by the degradation of the antioxidant added to stabilize the resin and residues of the solvents used for synthesizing the resin.

To examine how the gas components described above affect the substrate surface made of norbornene resin, experimental substrates are made of undried norbornene resin and the number of rugged surface portions on the substrate, the micro waviness (Wa) in the radial direction of the experimental substrate and the average surface roughness (Ra) in the radial direction of the experimental substrates are measured. Table 3 lists the results.

TABLE 3

| | Numbers of rugged portions (>1 μm) | Wa (Å) | Ra (Å) |
|---|---|---|---|
| Lot A | 1200 | 1000 | 13.5 |
| Lot B | 900 | 920 | 12.5 |
| Lot C | 700 | 870 | 12.0 |

The number of rugged surface portions is measured under an optical microscope. The micro waviness (Wa) and the surface roughness (Ra) are measured with a noncontact optical surface roughness tester (Chapman Surface Roughness Tester supplied from Chapman Instruments).

As Table 3 indicates, 700 or more rugged portions of 1 μm or more in height difference are caused in the surfaces of the experimental substrates. The observed micro waviness is higher than 850 Å. Furthermore, the observed average surface roughness is at least 12 Å. Errors are caused corresponding to the defective portions in the magnetic recording medium manufactured using the substrate having such defective surface portions. When the micro waviness is high or the surface roughness of the magnetic recording medium is large, the magnetic head fails to float at the start of flight or the head floating is damaged, finally causing head crash.

The results of the analyses on the atmospheric gas components and the low-boiling-point organic components and the results of the measurements on the number of rugged portions, the micro waviness and the surface roughness indicate that less rugged surface portions are caused and the micro waviness and the surface roughness are improved in the substrate manufactured by injection-molding the resin that contains less atmospheric gas components and less low-boiling-point organic components. Therefore, it is obvious that the gas components contained in the resin cause rugged portions and micro waviness in the surface of the substrate for magnetic recording media and roughen the substrate surface. In other words, it is considered that when molten resin yields more gases, the molten resin flows in the molding die cavity while yielding gases, causing rugged surface portions of several μm in height difference, higher micro waviness and higher surface roughness due to the obstructed resin flow.

Therefore, it is expected that if the gas components in the thermoplastic norbornene resin are removed, the rugged surface portions, the micro waviness and the surface roughness of the substrate for magnetic recording media will be reduced.

It is also expected that if a substrate made of a thermoplastic norbornene resin, containing less gas components, is used to manufacture a magnetic recording medium including a laminate for magnetic data recording on the substrate, the magnetic recording medium will be provided with a very flat and smooth surface having extremely few micro defects, reduced waviness and reduced surface roughness. The magnetic storage medium having a very flat and smooth surface, that facilitates excellent head flight, will be reliable and durable.

Now the modes for carrying out the present invention will be described.

First, a method of drying a thermoplastic norbornene resin according to the invention will be described.

The results of the foregoing analyses indicate that the gas components, that cause rugged portions, micro waviness and a rough surface, include atmospheric gas components such as $N_2$ and $O_2$ that are gases at the room temperature and organic components having 6 or more carbon atoms that are liquids at the room temperature. Thus, the boiling points of the gas components that should be removed from the thermoplastic norbornene resin distribute in a wide temperature range. The pellet of the thermoplastic norbornene resin is 1.5 mm or more in thickness. Therefore, for removing the gas components not only form the surface portions but also from the central portions of the resin pellets, it is considered that it is effective to dry the resin pellets not only under the ordinary pressure but also under vacuum.

Therefore, the method of drying the resin according to the invention dries the thermoplastic norbornene resin solely under vacuum or under the ordinary pressure and under vacuum. The thermoplastic norbornene resin is dried under the degree of vacuum of 20 Pa or lower at any temperature between 80 and 120° C. for any period between 2 and 16 hr. For drying the thermoplastic norbornene resin under the ordinary pressure, the resin is dried at any temperature between 80 and 120° C. between 12 and 24 hr. Although it is preferable to dry the resin under the ordinary pressure and under vacuum, drying the resin solely under vacuum poses no problem. For drying the resin under the ordinary pressure, the resin may be dried in the air or in a $N_2$ atmosphere.

Although the thermoplastic norbornene resin may be shaped with any shape as far as the shape is favorable for drying the resin, it is preferable to shape the resin with pellets.

For drying the thermoplastic norbornene resin solely under vacuum, it is preferable to dry the resin at 80° C. for 16 hr or longer, at 100° C. for 8 hr or longer, or at 120° C. for 4 hr or longer. For drying the thermoplastic norbornene resin under the ordinary pressure and under vacuum it is preferable to dry the resin under the ordinary pressure at 80° C. for 24 hr and under vacuum at 100° C. for 8 hr or longer; under the ordinary pressure at 100° C. for 12 hr and under vacuum at 100° C. for 8 hr or longer; under the ordinary pressure at 100° C. for 24 hr and under vacuum at 80° C. for 8 hr or longer; under the ordinary pressure at 100° C. for 24 hr and under vacuum at 100° C. for 4 hr or longer; under the ordinary pressure at 120° C. for 24 hr and under vacuum at 80° C. for 4 hr or longer; under the ordinary pressure at 120° C. for 24 hr and under vacuum at 100° C. for 2 hr or longer; or under the ordinary pressure at 120° C. for 24 hr and under vacuum at 120° C. for any period between 2 and 4 hr. The drying temperature and the drying period may be combined appropriately within the ranges of the temperatures and the periods described above.

After drying the thermoplastic norbornene resin by the method according to the invention, the contents of the atmospheric gas components and the low-boiling-point organic components are below the respective certain levels.

In detail, the content of $N_2$ is preferably 20 ppm or lower, the content of $O_2$ 20 ppm or lower, the contents of $H_2O$ 1 ppm or lower, the total contents of low-molecular-weight aliphatic hydrocarbons and oxidation products of the resin, such as alcohol compounds and carboxylic acid compounds, 20 ppb or lower, and the total contents of aromatic components 20 ppb or lower.

Now a plastic substrate for magnetic recording media according to the invention will be described. The plastic substrate for magnetic recording media according to the invention is made of a thermoplastic norbornene resin.

In detail, the plastic substrate for magnetic recording media according to the invention uses the thermoplastic norbornene resin dried by the method of drying according to the invention described above.

The substrate for magnetic recording media is manufactured by injection molding according to the invention. The plastic substrate is manufactured by using a molding die, the stamper thereof is fixed to a commercially supplied injection molding machine and by setting the resin temperature, the injection speed and the closing pressure at respective appropriate values. The temperatures of the stationary side and the mobile side of the molding die are set individually. For example, the resin temperature is set at 350° C., the injection speed at 170 mm/s, and the closing pressure at 70 kg/cm$^2$. Typically, the temperatures of the stationary side and the mobile side of the molding die are set at 130° C. A substrate of 95 mm in diameter and 1.27 mm in thickness is manufactured under these conditions.

The preferable substrate for magnetic recording media according to the invention includes less than 100 surface defects (rugged surface portions) of 1 µm×1 µm or wider in area in the surface thereof. For the preferable substrate, the straightness Pa in the radial direction thereof is 1 µm or less, the micro waviness Wa 500 Å or lower, and the average surface roughness 5 Å or lower.

Now a magnetic recording medium according to the invention will be described.

The magnetic recording medium according to the invention employs the above described substrate manufactured by injection-molding the thermoplastic norbornene resin dried by the foregoing method of drying according to the invention.

FIG. 1 is a cross sectional view of the magnetic recording medium according to the invention.

Referring now to FIG. 1, the magnetic recording medium according to the invention includes a plastic substrate 1 made by injection-molding the thermoplastic norbornene resin, dried by the foregoing method according to the invention. An intermediate layer 2 is on plastic substrate 1. A nonmagnetic layer 3 is on intermediate layer 2. A magnetic layer 4 is on nonmagnetic layer 3. A protection layer 5 is on magnetic layer 4. Finally, a liquid lubricant layer 6 is on protection layer 5. Intermediate layer 2, nonmagnetic layer 3, magnetic layer 4, protection layer 5, and liquid lubricant layer 6 are made of the respective conventional materials. In detail, intermediate layer 2 is a metal layer made, for example, of titanium (Ti). Nonmagnetic layer 3 is an undercoating layer made, for example, of chromium (Cr). Magnetic layer 4 is an alloy layer preferably of a cobalt (Co) alloy such as Co—Cr—Pt and Co—Cr—Ta. Protection layer 5 is preferably made of carbon. Liquid lubricant layer 6 is preferably made of a fluorine lubricant such as perfluoropolyether.

Although the magnetic recording medium according to the invention has been described with reference to FIG. 1, various modifications are possible considering the use thereof. For example, intermediate layer 2 may be omitted.

The magnetic recording medium may be any shape suitable to the instrument or the apparatus, thereon the magnetic recording medium is mounted. The magnetic recording medium for a hard disk drive (HDD) is shaped with a circular plate (disk).

The magnetic recording medium according to the invention exhibits excellent durability and stability for head seek under the high-speed and continuous test using a floating head. For the magnetic recording medium according to the invention, the output of a strain gauge after 24 hour seek is preferably 0.5 g or less.

Now a method of manufacturing a magnetic recording medium according to the invention will be described.

The method of manufacturing a magnetic recording medium according to the invention includes the steps of (a) drying a thermoplastic norbornene resin, (b) injection-molding the dried norbornene resin to form a plastic substrate, and (c) forming at least a magnetic layer, a protection layer and a liquid lubricant layer one after another on the plastic substrate. In the drying step, the norbornene resin is dried under vacuum or under the ordinary pressure and under vacuum to efficiently remove gas components contained in the norbornene resin.

The norbornene resin is dried as described above. The plastic substrate is manufactured by injection molding as described above.

In the forming steps, a laminate that facilitates magnetically storing data is formed on the plastic substrate in the following preferred method. Intermediate layer 2 is formed on a plastic substrate by sputtering. Nonmagnetic undercoating layer 3 is formed on intermediate layer 2. Magnetic layer 4 is formed on nonmagnetic layer 3. Protection layer 5 is formed on magnetic layer 4. Finally, liquid lubricant layer 6 is formed on protection layer 5 by coating a lubricant solution prepared by diluting a lubricant with a solvent.

Preferably, nonmagnetic undercoating layer 3 is a Cr layer. Preferably, magnetic layer 4 is a Co-14Cr-4Ta alloy layer.

The Cr nonmagnetic undercoating layer 3 is formed by sputtering. The Co-14Cr-4Ta magnetic alloy layer 4 is formed by sputtering. The carbon protection layer 5 is formed by sputtering. The carbon protection layer 5 mainly contains usual graphite, or the carbon protection layer 5 is a diamond-like-carbon (DLC) layer. Nitrogen may be added to the carbon protection layer 5. The lubricant layer 6 is formed by dip-coating or by spin-coating. Preferably, the lubricant is perfluoropolyether (ZDOL supplied from Ausimont S.P.A., AM2001 supplied from Ausimont S.P.A., DEMUNUM-SA supplied from Daikin Industries Ltd., or DEMUNUM-SP supplied from Daikin Industries Ltd.).

Intermediate layer 2, nonmagnetic undercoating layer 3, magnetic layer 4, protection layer 5 and lubricant layer 6 are as thick as the respective counterparts in the conventional magnetic recording media.

The constitution of the laminate is not limited to that described above. For example, the laminate that lacks intermediate layer 2 poses no problem on the magnetic recording medium.

Now the invention will be described more in detail below in connection with the embodiments thereof.

In drying norbornene resin pellets, drying methods, drying temperatures and drying periods of time are changed and examined as listed in Table 4.

TABLE 4

| | | Methods of drying resin pellets | | | |
| --- | --- | --- | --- | --- | --- |
| | | Drying under the ordinary pressure (in N2 atmosphere) | | Drying under vacuum (20 Pa or lower) | |
| | Methods of drying | Drying temps. (° C.) | Drying periods (hr) | Drying temps. (° C.) | Drying periods (hr) |
| Comparative | None | — | — | — | — |
| Embodiment 1 | Method 1 | — | — | 80 | 8 |
| Embodiment 2 | Method 2 | — | — | 80 | 16 |
| Embodiment 3 | Method 3 | — | — | 100 | 2 |

TABLE 4-continued

Methods of drying resin pellets

| | | Drying under the ordinary pressure (in N2 atmosphere) | | Drying under vacuum (20 Pa or lower) | |
|---|---|---|---|---|---|
| | Methods of drying | Drying temps. (° C.) | Drying periods (hr) | Drying temps. (° C.) | Drying periods (hr) |
| Embodiment 4 | Method 4 | — | — | 100 | 4 |
| Embodiment 5 | Method 5 | — | — | 100 | 8 |
| Embodiment 6 | Method 6 | — | — | 120 | 2 |
| Embodiment 7 | Method 7 | — | — | 120 | 4 |
| Embodiment 8 | Method 8 | — | — | 140 | 2 |
| Embodiment 9 | Method 9 | 80 | 24 | 100 | 8 |
| Embodiment 10 | Method 10 | 100 | 12 | 100 | 8 |
| Embodiment 11 | Method 11 | 100 | 24 | — | — |
| Embodiment 12 | Method 12 | 100 | 24 | 80 | 4 |
| Embodiment 13 | Method 13 | 100 | 24 | 80 | 8 |
| Embodiment 14 | Method 14 | 100 | 24 | 100 | 2 |
| Embodiment 15 | Method 15 | 100 | 24 | 100 | 4 |
| Embodiment 16 | Method 16 | 120 | 24 | — | — |
| Embodiment 17 | Method 17 | 120 | 24 | 80 | 2 |
| Embodiment 18 | Method 18 | 120 | 24 | 80 | 4 |
| Embodiment 19 | Method 19 | 120 | 24 | 100 | 2 |
| Embodiment 20 | Method 20 | 120 | 24 | 100 | 4 |
| Embodiment 21 | Method 21 | 120 | 24 | 120 | 2 |
| Embodiment 22 | Method 22 | 120 | 24 | 120 | 4 |
| Embodiment 23 | Method 23 | 140 | 24 | — | — |

Embodiment 1

Thermoplastic norbornene resin pellets of 2 kg were dried by the drying method 1 under the degree of vacuum of 20 Pa or lower. A part of the dried resin pellets were used to measure the gas contents therein for the evaluation described later.

A plastic substrate of 95 mm in diameter and 1.27 mm in thickness was manufactured by using a molding die, the stamper thereof is fixed to a commercially supplied injection molding machine with the maximum injection-molding pressure of 70 t. The resin temperature was set at 350° C., the injection speed at 170 mm/s, the closing pressure at 70 kg/cm$^2$, the temperature of the stationary side of the molding die at 130° C. and the temperature of the mobile side of the molding die at 130° C.

Embodiments 2 through 8

Resin pellets were dried in the same way as according to the embodiment 1 except that the resin pellets were dried by any of the methods 2 through 8 described in Table 4, and substrates for magnetic recording media were obtained using the resin pellets dried by the methods 2 through 8. In the drying methods 2 through 8, the degree of vacuum was set at 20 Pa or lower.

Embodiments 9 through 23

Resin pellets were dried in the same way as according to the embodiment 1 except that the resin pellets were dried by any of the methods 9 through 23 described in Table 4, and substrates for magnetic recording media were obtained using the resin pellets dried by the methods 9 through 23. In drying the resin pellets under the ordinary pressure, the resin pellets were dried in a nitrogen atmosphere. For drying the resin pellets under vacuum, the degree of vacuum was set at 20 Pa or lower.

Embodiments 24 through 46

A magnetic recording medium according to any of the embodiments 24 through 46 was obtained in the following way. A Cr undercoating layer of 500 Å in thickness was deposited by sputtering on the substrate prepared according to any of the embodiments 1 through 23, a Co-14Cr-4Ta magnetic layer of 300 Å in thickness on the Cr undercoating layer, and a carbon protection layer of 80 Å in thickness on the magnetic layer. After depositing these layers, the surface of the carbon protection layer was burnished with a burnishing tape, and a fluorine lubricant (FOMBLINZ-DOL supplied from Ausimont S.P.A. and such a commercially supplied fluorine lubricant) was spin-coated on the burnished carbon protection layer, resulting in a magnetic recording medium.

Comparative Example 1

A substrate according to the comparative example 1 was obtained in the same way as the substrate according to the embodiment 1 except that the resin pellets were not dried according to the comparative example 1.

Comparative Example 2

A magnetic recording medium according to the comparative example 2 was obtained by forming a laminate in the same way as according to the embodiment 24 on the substrate prepared according to the comparative example 1.

Evaluations

The contents of gas components in the resin pellets dried according to the embodiments 1 through 23 and comparative example 1 were measured. The number of rugged portions in the surface of the substrates prepared using the resin pellets dried according to the embodiments 1 through 23 and comparative example 1, straightness (Pa) in the radial directions of the respective substrates, micro waviness (Wa) in substrate surfaces, and average surface roughness were measured.

The contents of the gas components were measured by the methods described in connection with Tables 1 and 2. The number of the rugged surface portions, the straightness, the micro waviness and the average surface roughness were measured by the methods described in connection with Table 3.

The contents of the gas components in the resin pellets are listed in Table 5. The number of the rugged surface portions, the straightness, the micro waviness and the average surface roughness in the surfaces of the substrates manufactured by injection molding are listed in Table 6.

TABLE 5

Contents of the gas components in resin pellets

| | Methods of drying | Atmospheric gas components (ppm) | | | Low-boiling-point organic components (ppb) | |
|---|---|---|---|---|---|---|
| | | $N_2$ | $O_2$ | $H_2O$ | Aliphatic hydrocarbons, alcohol and carboxylic acid compounds. | Aromatic components |
| Comparative | None | 880.0 | 360.0 | 10.0 | 160 | 60 |
| Embodiment 1 | Method 1 | 48.0 | 20.0 | 1.0 | 30 | 20 |
| Embodiment 2 | Method 2 | 19.2 | 13.5 | 0.8 | 18 | 15 |
| Embodiment 3 | Method 3 | 200.0 | 50.0 | 2.5 | 52 | 43 |
| Embodiment 4 | Method 4 | 45.0 | 35.0 | 1.1 | 30 | 18 |
| Embodiment 5 | Method 5 | 16.3 | 10.3 | 0.7 | 15 | 12 |
| Embodiment 6 | Method 6 | 90.0 | 22.0 | 1.0 | 40 | 32 |
| Embodiment 7 | Method 7 | 18.5 | 15.0 | 0.8 | 15 | 10 |
| Embodiment 8 | Method 8 | 16.0 | 9.2 | 0.6 | 48 | 41 |
| Embodiment 9 | Method 9 | 18.0 | 15.5 | 0.9 | 20 | 18 |
| Embodiment 10 | Method 10 | 17.5 | 14.0 | 0.7 | 18 | 15 |
| Embodiment 11 | Method 11 | 100.0 | 35.0 | 1.6 | 19 | 18 |
| Embodiment 12 | Method 12 | 75.0 | 28.0 | 1.1 | 19 | 17 |
| Embodiment 13 | Method 13 | 19.0 | 17.5 | 0.8 | 15 | 15 |
| Embodiment 14 | Method 14 | 60.0 | 20.0 | 0.9 | 18 | 17 |
| Embodiment 15 | Method 15 | 18.5 | 11.2 | 0.8 | 15 | 13 |
| Embodiment 16 | Method 16 | 65.0 | 19.5 | 1.2 | 17 | 15 |
| Embodiment 17 | Method 17 | 25.0 | 15.5 | 0.85 | 15 | 12 |
| Embodiment 18 | Method 18 | 14.0 | 14.5 | 0.8 | 15 | 10 |
| Embodiment 19 | Method 19 | 14.5 | 13.8 | 0.7 | 13 | 13 |
| Embodiment 20 | Method 20 | 13.0 | 12.8 | 0.7 | 17 | 15 |
| Embodiment 21 | Method 21 | 13.0 | 12.0 | 0.7 | 18 | 16 |
| Embodiment 22 | Method 22 | 12.0 | 11.5 | 0.6 | 25 | 20 |
| Embodiment 23 | Method 23 | 25.5 | 17.5 | 0.9 | 45 | 30 |

TABLE 6

Rugged surface portions, straightness, micro waviness and average surface roughness

| | Methods of drying | Counting under an optical microscope | Measurements with a Chapman Surface Roughness Tester | | |
|---|---|---|---|---|---|
| | | Number of rugged portions (<1 μm) | Straightness (μm) | Micro waviness Wa (Å) | Roughness (Å) |
| Comparative 1 | None | 1200 | 1.70 | 1000 | 13.5 |
| Embodiment 1 | Method 1 | 250 | 1.12 | 680 | 8.8 |
| Embodiment 2 | Method 2 | 90 | 0.93 | 490 | 4.8 |
| Embodiment 3 | Method 3 | 500 | 1.40 | 780 | 10.0 |
| Embodiment 4 | Method 4 | 200 | 1.35 | 650 | 7.5 |
| Embodiment 5 | Method 5 | 30 | 0.60 | 270 | 2.8 |
| Embodiment 6 | Method 6 | 350 | 1.05 | 650 | 10.2 |
| Embodiment 7 | Method 7 | 50 | 0.80 | 320 | 3.5 |
| Embodiment 8 | Method 8 | 125 | 0.95 | 520 | 5.5 |
| Embodiment 9 | Method 9 | 50 | 0.70 | 420 | 4.2 |
| Embodiment 10 | Method 10 | 55 | 0.75 | 420 | 4.0 |
| Embodiment 11 | Method 11 | 120 | 0.95 | 580 | 6.5 |
| Embodiment 12 | Method 12 | 110 | 1.00 | 590 | 6.2 |
| Embodiment 13 | Method 13 | 40 | 0.82 | 280 | 3.4 |
| Embodiment 14 | Method 14 | 85 | 0.90 | 520 | 6.0 |
| Embodiment 15 | Method 15 | 45 | 0.85 | 290 | 3.8 |
| Embodiment 16 | Method 16 | 95 | 0.92 | 520 | 5.7 |
| Embodiment 17 | Method 17 | 80 | 0.90 | 480 | 5.3 |
| Embodiment 18 | Method 18 | 25 | 0.60 | 250 | 2.5 |
| Embodiment 19 | Method 19 | 20 | 0.52 | 210 | 2.2 |
| Embodiment 20 | Method 20 | 55 | 0.62 | 200 | 2.0 |
| Embodiment 21 | Method 21 | 65 | 0.60 | 220 | 2.0 |
| Embodiment 22 | Method 22 | 120 | 0.72 | 250 | 2.4 |
| Embodiment 23 | Method 23 | 150 | 0.95 | 520 | 4.8 |

As Tables 5 and 6 indicate, the rugged surface portions in the surface of the substrate for magnetic recording media are reduced and, at the same time, the straightness in the radial direction of the substrate, the micro waviness and the surface roughness are improved with reducing gas contents in the resin.

By adjusting the content of $N_2$ at 20 ppm or lower, the content of $O_2$ at 20 ppm or lower, the content of $H_2O$ at 1 ppm or lower, the total contents of aliphatic components at 20 ppb or lower, and the total contents of aromatic components at 20 ppb or lower, the rugged surface portions are suppressed at 100 or less, the straightness in the radial direction of the substrate at 1.0 μm or less, the micro waviness at 500 Å or lower and the surface roughness at 5 Å or lower.

More in detail, as the results according to the embodiments 2, 5 and 7 indicate, the desired characteristics, including the number of the rugged surface portions, the straightness of the substrate surface, the micro waviness and the surface roughness, are obtained by drying the resin under vacuum at 80° C. for 16 hr, at 100° C. for 8 h, or at 120° C. for 4 hr.

As the results according to the embodiment 9 indicate, the desired characteristics, including the number of the rugged surface portions, the straightness of the substrate surface, the micro waviness and the surface roughness, are obtained by drying the resin under the ordinary pressure at 80° C. for 24 hr and under vacuum at 100° C. for 8 hr. As the results according to the embodiments 13 and 15 indicate, the desired characteristics, including the number of the rugged surface portions, the straightness of the substrate surface, the micro waviness and the surface roughness, are obtained by drying the resin under the ordinary pressure at 100° C. for 24 hr and under vacuum at 80° C. for 8 hr or at 100° C. for 4 hr. As the results according to the embodiments 18, 19 and 21 indicate, the desired characteristics, including the number of the rugged surface portions, the straightness of the substrate surface, the micro waviness and the surface roughness, are obtained by drying the resin under the ordinary pressure at 120° C. for 24 hr and under vacuum at 80° C. for 4 hr, at 100° C. for 2 hr or at 120° C. for 2 hr.

The thermoplastic norbornene resin is dried more effectively by combining the drying under the ordinary pressure and the drying under vacuum. In other words, the gas components staying deep in the resin pellets are removed more effectively by combining the drying under the ordinary pressure and the drying under vacuum.

As the results for the embodiments 8, 22 and 23 indicate, although the atmospheric gas components are reduced more by drying at a too high temperature for a too long time, the drying at a too high temperature for a too long time causes thermal decomposition of the resin, increases the low-boiling-point organic components and, especially, increases the rugged surface portions.

Continuous and high-speed head seek durability tests for a low-flying-height head are conducted on the magnetic recording medium according to the embodiments 24 through 46 and the comparative example 2. The continuous and high-speed head seek durability tests are conducted on the basis of the finding that the durability of the magnetic recording medium and the stable flight of the magnetic head are closely related with each other. The continuous and high-speed head seek durability tests utilize the fact that the output of a strain gauge moving with the magnetic head is changed by the contact of the magnetic head and the rugged portions in the disk surface. The continuous and high-speed head seek durability tests measure the outputs of the strain gauge to determine the durability of the magnetic recording media.

In detail, the continuous and high-speed head seek durability tests read the outputs (g) of a strain gauge as the indications of the resistance against friction caused in a high-temperature and high-humidity environment between a giant magneto-resistive (GMR) head (for the flying height of 1.0 μ" and for reading out the data stored at the bit density of 10 Gbit/in$^2$) and a magnetic recording disk. The GMR head conducts a high-speed head seek continuously for 24 hr at the output frequency of 40.0 Hz within the radial range between 19.0 mm and 44.5 mm of the magnetic recording disk rotating at 4500 rpm. The tests are conducted using a commercially supplied continuous start stop (CSS) tester (supplied from Center for Tribology Inc.). The results are listed in Table 7.

TABLE 7

Results of head seek tests on magnetic recording media

| | Methods of drying | Outputs of strain gauge at the end of the seek test (g) |
|---|---|---|
| Comparative 2 | None | * |
| Embodiment 24 | Method 1 | * |
| Embodiment 25 | Method 2 | 0.48 |
| Embodiment 26 | Method 3 | * |
| Embodiment 27 | Method 4 | * |
| Embodiment 28 | Method 5 | 0.25 |
| Embodiment 29 | Method 6 | * |
| Embodiment 30 | Method 7 | 0.33 |
| Embodiment 31 | Method 8 | 1.20 |
| Embodiment 32 | Method 9 | 0.46 |
| Embodiment 33 | Method 10 | 0.44 |
| Embodiment 34 | Method 11 | 1.10 |
| Embodiment 35 | Method 12 | 0.85 |
| Embodiment 36 | Method 13 | 0.30 |
| Embodiment 37 | Method 14 | 0.60 |
| Embodiment 38 | Method 15 | 0.50 |
| Embodiment 39 | Method 16 | 0.62 |
| Embodiment 40 | Method 17 | 0.56 |
| Embodiment 41 | Method 18 | 0.20 |
| Embodiment 42 | Method 19 | 0.20 |
| Embodiment 43 | Method 20 | 0.28 |
| Embodiment 44 | Method 21 | 0.43 |
| Embodiment 45 | Method 22 | 0.65 |
| Embodiment 46 | Method 23 | 0 |

* Impossible to measure since the head fails to float.

As Tables 6 and 7 indicate, the magnetic recording medium, including any of the substrates, the rugged surface portions, the straightness in the radial directions, the micro waviness and the surface roughness thereof, are improved, exhibiting excellent head seek durability. In detail, the magnetic recording medium, including the substrate with 100 or less rugged surface portions, the straightness in the radial direction thereof of 1.0 μm or less, the micro waviness of 500 Å or lower and the surface roughness of 5 Å or lower, exhibits excellent continuous head seek durability, for that the output of the strain gauge is 0.5 g or less after the 24 hr continuous head seek. The head and the disk with few rugged surface portions, improved straightness in the radial directions, improved micro waviness and improved surface roughness, contact with each other less frequently in the low-flying-height, continuous and high-speed head seek tests and facilitate excellent head flight.

Thus, the magnetic recording medium according to the invention exhibits excellent durability and reliability in continuous and high-speed head seek tests.

As described above, the atmospheric gas components (such as $N_2$, $O_2$ and $H_2O$), and the low-boiling-point organic components (including deterioration products and oxidation products of the norbornene resin such as aliphatic hydrocarbons, alcohol compounds and carboxylic acid compounds and aromatic components such as deteriorated antioxidants and residues of the solvents for synthesizing the resin) contained in the thermoplastic norbornene resin are suppressed below certain levels.

The substrate for magnetic recording media according to the invention, manufactured by injection-molding the thermoplastic norbornene resin dried by the method according to the invention, has a precisely machined surface that contains few rugged surface portions and exhibits improved straightness in the radial direction of the substrate, improved micro waviness and improved surface roughness.

The magnetic recording medium according to the invention, that facilitates stable head flight in the low-flying-height, continuous and high-speed durability tests, is very precise and very reliable.

The manufacturing method according to the invention facilitates manufacturing very precise and very reliable magnetic recording media with excellent mass-productivity and with low manufacturing costs.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A plastic substrate for magnetic recording media, said plastic substrate being manufactured by injection molding a thermoplastic norbornene resin dried by a method comprising:
    drying said thermoplastic norbornene resin under one of a degree of vacuum of 20 Pa or lower, and a degree of vacuum of 20 Pa or lower and ordinary pressure; wherein
    said drying removes atmospheric gas components and low-boiling-point organic components contained in said thermoplastic norbornene resin; and wherein
    said thermoplastic norbornene resin contains, after said drying, $N_2$ of 20 ppm or lower, $O_2$ of 20 ppm or lower, and $H_2O$ of 1 ppm or lower.

2. A plastic substrate for magnetic recording media, of claim 1 wherein:
    said drying under ordinary pressure is conducted at a temperature between 80 and 120° C.; and
    said drying under vacuum is conducted under a degree of vacuum of 20 Pa or lower at a temperature between 80 and 120° C.

3. A plastic substrate for magnetic recording media, of claim 1 wherein:
    the thermoplastic norbornene resin contains, low-boiling-point aliphatic organic components of 20 ppb or lower in total, and low-boiling-point aromatic organic components of 20 ppb or lower in total.

4. A plastic substrate for magnetic recording media, of claim 2 wherein:
    the thermoplastic norbornene resin contains, after the drying, $N_2$ of 20 ppm or lower, $O_2$ of 20 ppm or lower, $H_2O$ of 1 ppm or lower, low-boiling-point aliphatic organic components of 20 ppb or lower in total, and low-boiling-point aromatic organic components of 20 ppb or lower in total.

5. The plastic substrate according to claim 1, wherein said plastic substrate contains, in a surface thereof, 100 or less rugged portions of 1 μm×1 μm or wider in area wherein said substrate is 95 mm in diameter.

6. The plastic substrate according to claim 1, wherein:
    a straightness, Pa, in the radial direction of said plastic substrate, is 1 μm or less;
    a micro-waviness of said plastic substrate is 500 Å or lower; and
    an average surface roughness of said plastic substrate is 5 Å or lower.

7. The plastic substrate according to claim 5, wherein:
    a straightness, Pa, in the radial direction of said plastic substrate, is 1 μm or less;
    a micro-waviness of said plastic substrate is 500 Å or lower; and
    an average surface roughness of said plastic substrate is 5 Å or lower.

8. A magnetic recording medium comprising:
    said plastic substrate according to claim 1;
    a magnetic layer above said plastic substrate;
    a protection layer on said magnetic layer; and
    a lubricant layer on said protection layer.

9. The magnetic recording medium according to claim 8, wherein said plastic substrate contains, in a surface thereof, 100 or less rugged portions of 1 μm×1 μm or wider in area wherein said substrate is 95 mm in diameter.

10. The magnetic recording medium according to claim 8, wherein:
    a straightness, Pa, in the radial direction of said plastic substrate, is 1 μm or less;
    a micro-waviness of said plastic substrate is 500 Å or lower; and
    an average surface roughness of said plastic substrate is 5 Å or lower.

11. The magnetic recording medium according to claim 9, wherein:
    a straightness, Pa, in the radial direction of said plastic substrate, is 1 μm or less;
    a micro-waviness of said plastic substrate is 500 Å or lower; and
    an average surface roughness of said plastic substrate is 5 Å or lower.

12. The magnetic recording medium according to claim 8, wherein an output of a strain gauge is 0.5 g or less at the end of continuous and high-speed head seek tests conducted for 24 hr on said magnetic recording medium, rotating at 4500 rpm using a low-flying-height head having a flying height of 1 μ";
    wherein said output is a measure of resistance between the surface of the head and the surface of the protection layer.

* * * * *